Patented Feb. 24, 1931

1,793,670

UNITED STATES PATENT OFFICE

GEORGE BORROWMAN, OF EVANSTON, ILLINOIS

WATER-PURIFYING MATERIAL AND METHOD OF PREPARING AND USING THE SAME

No Drawing.   Application filed September 14, 1927.   Serial No. 219,564.

This invention relates to base exchange water purifying materials of organic nature, especially materials comprising humic substances and to processes of preparing and of using such materials; all as more fully hereinafter described and as claimed.

A common method for purification of water now in use employ certain inorganic substances known as exchange silicates. These are insoluble hydrous compounds of silica, iron or alumina, or both, with an exchangeable alkali metal, usually sodium. The silicates are used in a granular form, and are employed as a filter bed through which the water to be treated is percolated. When hard water, i. e., water containing calcium or magnesium, is thus subjected to the action of such exchange silicate, the silicate takes up the calcium and magnesium from the water and gives up its soluble alkali metal to the water, the silicate remaining otherwise insoluble and substantially unchanged. This process is known as purifying or softening water by base exchange.

After a period of use the exchange silicate has more or less exhausted its exchangeable alkali metal and may be revivified for further use. This is done by subjecting the silicate to the action of a solution of a salt of an alkali metal, usually sodium chloride. The first reaction is thus reversed, and the material takes up alkali metal from the salt solution and gives up its calcium and magnesium to the solution. The silicate is washed after the alkali salt treatment and is then ready for reuse. In accordance with filtering practice the bed is backwashed periodically to prevent channeling or consolidation and to cleanse the granules.

The exchange silicates are in some cases natural substances and in other cases they are of artificial origin. The artificial silicates are difficult and expensive to prepare. The natural silicates capable of serving this purpose are exceedingly limited in number and such as are available require considerable treatment to fit them for use.

The substances which I propose to use for base exchange softening are not in the same category as the base exchange silicates. I propose to use granular materials of organic nature, having base exchange properties, as for example, granular humic substances.

The decay of vegetable matter results in the formation of various organic acids such as ulmic, mellitic, humic, etc. These acids combine with various bases to form compounds such as those of calcium, magnesium, iron, and aluminum. These natural humic materials are found in the humic substances peat and the coals, especially lignites or brown coals. They may also be prepared artificially.

These organic compounds have base exchange properties. Thus when lignite is treated with a solution of a salt of an alkali metal, as sodium chloride, the alkali metal is taken up by the lignite and its calcium and magnesium are given up to the solution, the lignite remaining otherwise insoluble. Now if this product be washed and a hard water is subjected to the action of it, the first reaction is reversed, the hardening elements, calcium and magnesium, being taken up by the lignite and the alkali metal given up to the water. When the lignite has exhausted its exchangeable metal it may be revivified by again treating it with a solution of a salt of an alkali metal. After washing, it may be used again for the softening of water. In other words, the behavior of the lignite is thus similar to that of base exchange silicates.

Lignite or brown coal is widely distributed over the earth in immense deposits. It is usually in consolidated masses. It possesses the physical properties requisite in material to be used as a filtering medium in practical base exchange water softening. That is, it is relatively hard, heavier than water, permits of granulating, does not become mushy in water and when used as a filter bed permits of rapid and uniform filtration. To render such material suitable for use as a water softening agent it should be granulated and then treated with a solution of an alkali salt and washed. In the foregoing salt treatment and washing and in its subsequent use for softening water, the granules should be arranged as a filter bed, percolating the liquids therethrough in the manner in which the exchange silicates are commonly used. Owing to the well-known tendency of some lignites or brown coals to air-slake, it is preferable in the preparation of these materials for water softening to crush them to the desired mesh, while fresh, since after much drying dust and fines are produced. The fine dust adheres to the granules and in such cases it is preferably washed off before the filter bed is prepared. It is therefore also desirable to prevent excessive drying of the granulated material to prevent further dust formation.

The introduction of granular organic materials for base exchange water purification expands greatly the possibilities in the practise of the art of base exchange softening, heretofore believed to be confined to inorganic compounds, i. e., the exchange silicates. Materials heretofore of little or no use are thus made available, at less cost, and with various other advantages, among which are the following: A filter bed of lignite or brown coal eliminates the contamination of the softened effluent with silica or silicates, frequently objectionable when exchange silicates are used. Lignite or brown coal is very much lighter in weight than the natural exchange silicates and hence is much more advantageous to handle and transport and a filter bed of it requires less substantial supports. There is much less tendency to pack and cause loss of head and channeling. It offers much less resistance to the backflow in backwashing. The effluent from the coal bed is free from the earthy odor frequently found objectionable when base exchange silicates are used. Lignite or brown coal is more resistant to acids than base exchange silicates. It is not alkaline in reaction and hence imparts no alkalinity to the effluent as do many base exchange silicates.

I claim as my invention:—

1. The process of softening water which comprises percolating the water through a granular bed comprising lignite or brown coal having an exchangeable alkali metal until the exchangeable alkali metal of such bed is more or less exhausted, thereafter revivifying said bed by percolating therethrough a solution of sodium chloride, washing the bed and once more using it for the softening of water.

2. The process of preparing a water purifying material which comprises granulating lignite or brown coal, treating the granulated material with a solution of sodium chloride and then washing it.

3. An article of manufacture comprising lignite or brown coal having an exchangeable alkali metal.

4. The process of softening water which comprises granulating lignite or brown coal, preparing a bed of such granulated material, subjecting such bed of material to the action of a solution of sodium chloride, washing the bed, percolating therethrough the water to be softened and then repeating the last three steps.

In testimony whereof, I affix my signature.
GEORGE BORROWMAN.